United States Patent

[11] 3,588,362

[72] Inventor Sholom Kass
12 Herzog St., Rehovoth, Israel

[21] Appl. No. 762,103
[22] Filed Sept. 24, 1968
[45] Patented June 28, 1971
[32] Priority Sept. 26, 1967
[33] Israel
[31] 28,681

[54] AUTOMATIC DIGITAL IMPULSE TRANSMISSION SYSTEM
8 Claims, 9 Drawing Figs.

[52] U.S. Cl. ........ 179/5, 179/90BD, 179/90B
[51] Int. Cl. ........ H04m11/04
[50] Field of Search ........ 179/90 (B), 90 (CI), 90 (ADO), 90 (BD), 5

[56] References Cited
UNITED STATES PATENTS

| | | | |
|---|---|---|---|
| 3,441,685 | 4/1969 | Wallace | 179/90 |

FOREIGN PATENTS

| | | | |
|---|---|---|---|
| 1,048,251 | 4/1962 | Great Britain | 179/90 |
| 1,036,467 | 5/1962 | Great Britain | 179/90 |

*Primary Examiner*—William C. Cooper
*Assistant Examiner*—Tom D'Amico
*Attorney*—Arthur B. Colvin

ABSTRACT: An automatic digital impulse transmission system particularly but not exclusively concerned with the automatic impulsing of telephone lines so as to actuate automatically automatic telephone dial exchanges. Thus, the invention is applicable to the automatic dialling of one or more telephone numbers in a predetermined sequence in response to the establishment of one or more alarm conditions. Alternatively, the invention is applicable to the provision of an automatic dialling mechanism, for office use which can be preset to a predetermined number of telephone numbers.

Figure 1:
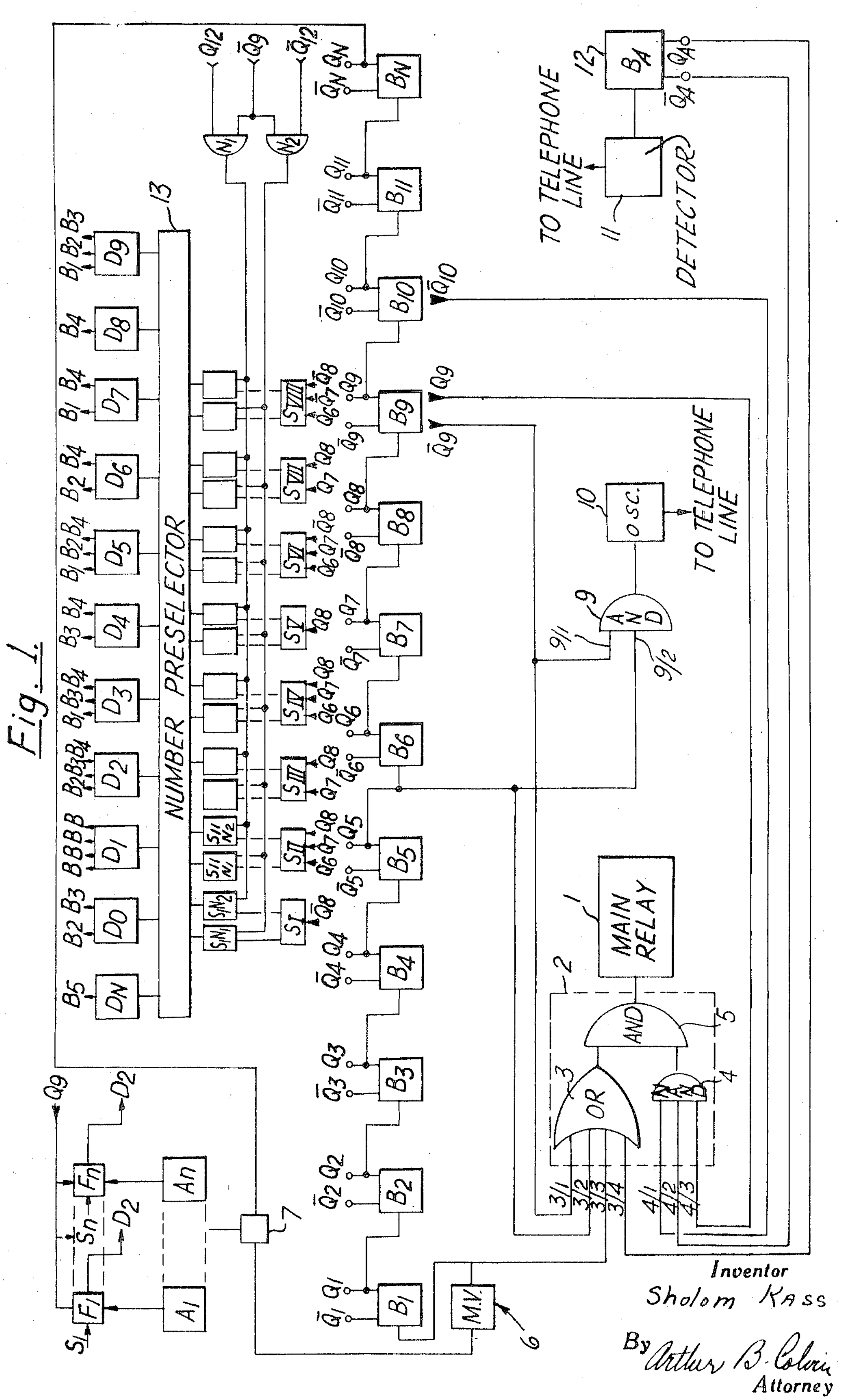

Inventor
Sholom Kass
By Arthur B. Colvin
Attorney

Inventor
Sholom Kass
By Arthur B. Colvin
Attorney

Inventor
Sholom Kass
By Arthur B. Colvin
Attorney

Inventor
Sholom Kass
By Arthur B. Colvin
Attorney

Inventor
Sholom Kass

By Arthur B. Colvin
Attorney

Inventor
Sholom KASS
By Arthur B. Colvin
Attorney

Inventor
Sholom Kass
By Arthur B. Colvin
Attorney

AUTOMATIC DIGITAL IMPULSE TRANSMISSION SYSTEM

This invention relates to an automatic digital impulse transmission system of the kind wherein digital information is to be transmitted to a transmission channel in the form of impulses. The invention is particularly, but not exclusively, concerned with the automatic impulsing of telephone lines with the aim of automatically actuating automatic telephone dial exchanges, the impulsing of the line serving to call one or more predetermined telephone numbers and, having thereby established telephone contact between subscribers, to transmit information.

For the purposes of the present specification the action of transmitting digital impulses to a telephone line corresponding to the differing digits of a telephone number will be referred to as the "dialling" of the number, it being of course understood that the term is used in a metaphorical senses as the system is equally applicable to telephone systems wherein impulsing is not effected by means of dialling as such.

The automatic system in accordance with the present invention, insofar as it concerns telephone systems, has two main spheres of application which can be interrelated.

The first sphere of application concerns the automatic dialling of one or more telephone numbers in a predetermined sequence in response to the establishment of one or more alarm conditions and transmitting information in the form of recognizable signals enabling the subscriber to identify the alarm condition.

The second, and related, sphere of application is the provision of an automatic dialling mechanism suitable for office use which can be preset to a predetermined number of telephone numbers (which can of course be varied) whereby, upon actuation, any one of the telephone numbers can automatically be dialled and, in the event that no reply is received, the automatic dialling procedure can be repeated as often as required.

In connection with the first sphere of application various systems have been hitherto proposed in the simplest of which a private telephone line is provided to connect the subscribers, an alarm condition occurring at one subscriber actuating this private telephone line and leading to the provision of a visual or audible signal at the other subscriber. The limitations of such a system, involving as it does the provision of special private telephone lines, are obvious and do not need further stressing.

In accordance with a further known system, regular telephone lines are employed and the relay which places the lines between two subscribers in circuit is arranged to be actuated by a mechanically displaced magnetic tape or by a mechanically rotating disc. In either case the information required to effect the automatic dialling and to transmit the necessary signals is prerecorded on the tape or preimpressed on the disc. In such a case the occurrence of an alarm condition actuates the relay so as to establish telephonic connection with a single predetermined subscriber whereupon the desired signals are transmitted. The fact that this hitherto proposed system involves the use of mechanically moving parts which are inherently subject to wear and deterioration detracts from its effectiveness and reliability. Furthermore the fact that the system is mechanically arranged to establish contact between only a single pair of subscribers has the result that, when it is desired to change the telephone numbers between which contact is to be established, a complicated mechanical operation is involved. The existing system furthermore renders it difficult, if not impossible, to effect the sequential calling of two or more telephone numbers, an eventuality which may be highly desirable, if not essential, where signals conveying information concerning an alarm condition have to be transmitted to more than one subscriber particularly in the case where the first subscriber cannot be contacted. Similarly such mechanically operated systems do not readily lend themselves to the transmission of information concerning a plurality of alarm conditions.

The same situation exists in connection with the second sphere of application of the invention, namely to a pure automatic dialling mechanism seeing that in most if not in all cases such a mechanism relies on the operation of moving parts with the disadvantages inherent therein referred to above and the lack of flexibility of such a system to deal with a plurality of telephone numbers.

It is an object of the present invention to provide an automatic digital impulse transmission system in which the above referred to disadvantages are substantially overcome or avoided.

According to the present invention there is provided an automatic digital impulse transmission system comprising a relay adapted to connect and disconnect the system to and from a signal transmission channel, a frequency divider chain formed of a plurality of interconnected bistable elements, a source of impulses adapted to actuate the chain and to be coupled to the relay actuating means for actuating the said source of impulses and gate circuits responsively coupled to the outputs of the different constituent bistable elements of the chain so as to actuate and deactuate the relay in accordance with a predetermined sequence.

Preferably the system is employed for actuating an automatic dial telephone exchange, the relay being coupled to the telephone lines and the predetermined sequence including a cycle of time intervals which includes a line impulsing period during which impulses corresponding to the respective digits of a telephone number are transmitted to the line.

Where the system is associated with an alarm condition switching device the system is so adapted as to transmit identifiable audio signals to the subscriber, each audio signal being associated with a specific alarm condition, the duration or other characteristics of the audio signal enabling the subscriber to identify which alarm condition has occurred.

The source of impulses can be constituted by a free running multivibrator (arranged to be actuated upon the occurrence of an alarm condition or in any other way) and arranged to supply impulses, for example at the rate of 10 per second, to the relay. The interconnection of the bistable elements of the frequency divider chain with the gate circuits results in the production of impulses of longer duration which effectively define the main operation periods of the system, namely, the wait for dial tone period, the number dialling period, the wait for answer period and the hang up telephone period, these four periods constituting together a complete cycle of operation.

The precise distribution and duration of these periods is determined by interconnections within the frequency divider chain via a digit selection matrix. Thus the relay is either held open or held closed and, when held open, transmits impulses as required. Additionally the system in accordance with the present invention utilizes the same frequency divider chain to provide gating signals for an audio frequency signal generator which results in the transmission of audio frequency signals of differing lengths to the telephone line during the wait for answer period and corresponding to the occurrence or nonoccurrence of specific alarm conditions.

Finally the system is readily applicable for the automatic dialling of any one of a plurality of telephone numbers in any required sequence. Thus the dialling of a first number can proceed until an answer has been received or until the completion of a predetermined number of the above referred to cycles whereupon the dialling of the second number is initiated and so on.

The alarm conditions which can be employed to actuate alarm conditions switches can be for example the occurrence of fire, smoke, excess pressure, temperature rise, unauthorized intrusion, or the like. Alternatively, where the system is merely used for automatic dialling, the actuation of the system can be made manually by the subscriber enabling the telephone number to be dialled automatically and as many times as required with a minimum of effort or supervision.

Figure 2:
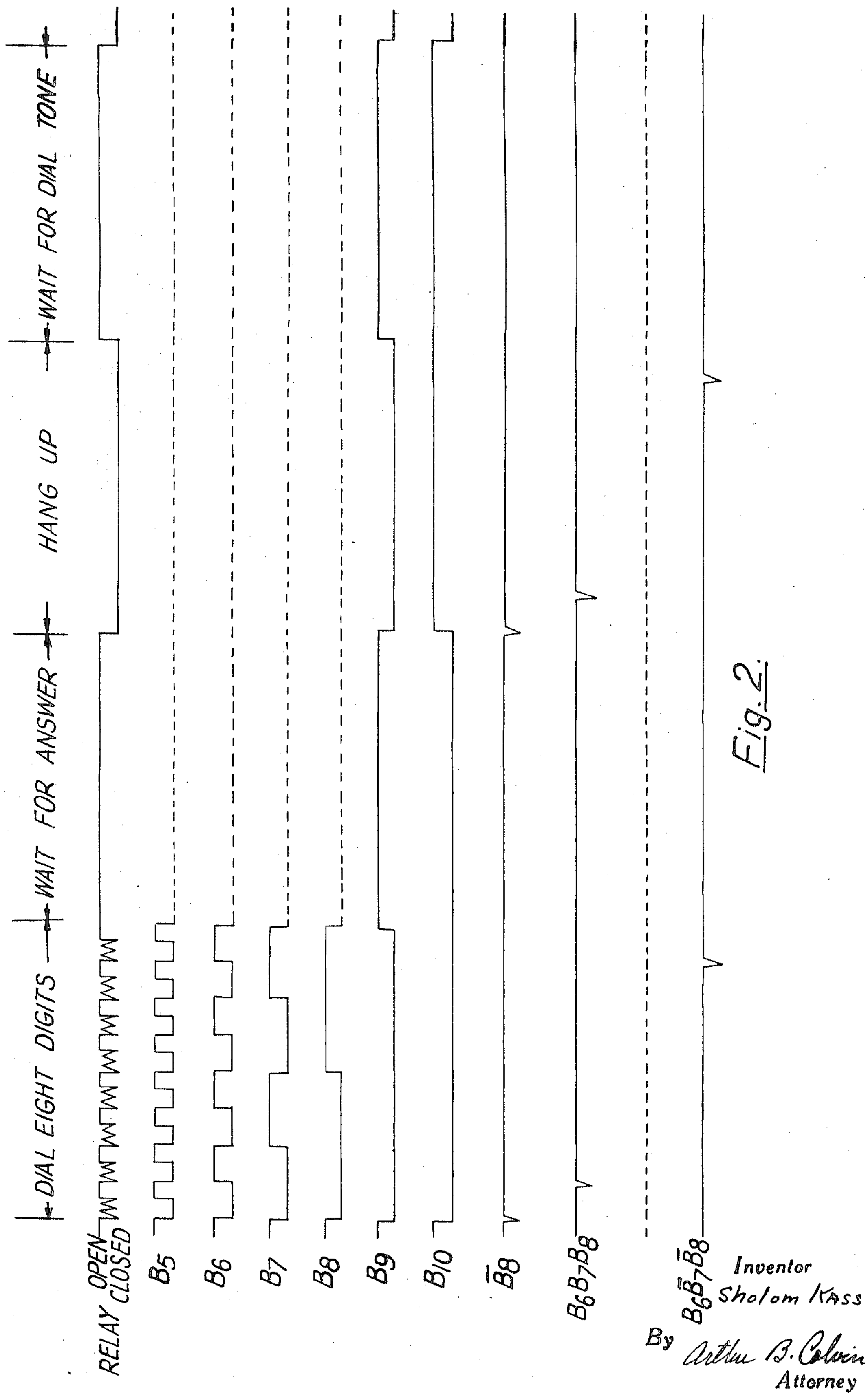
Figure 3:
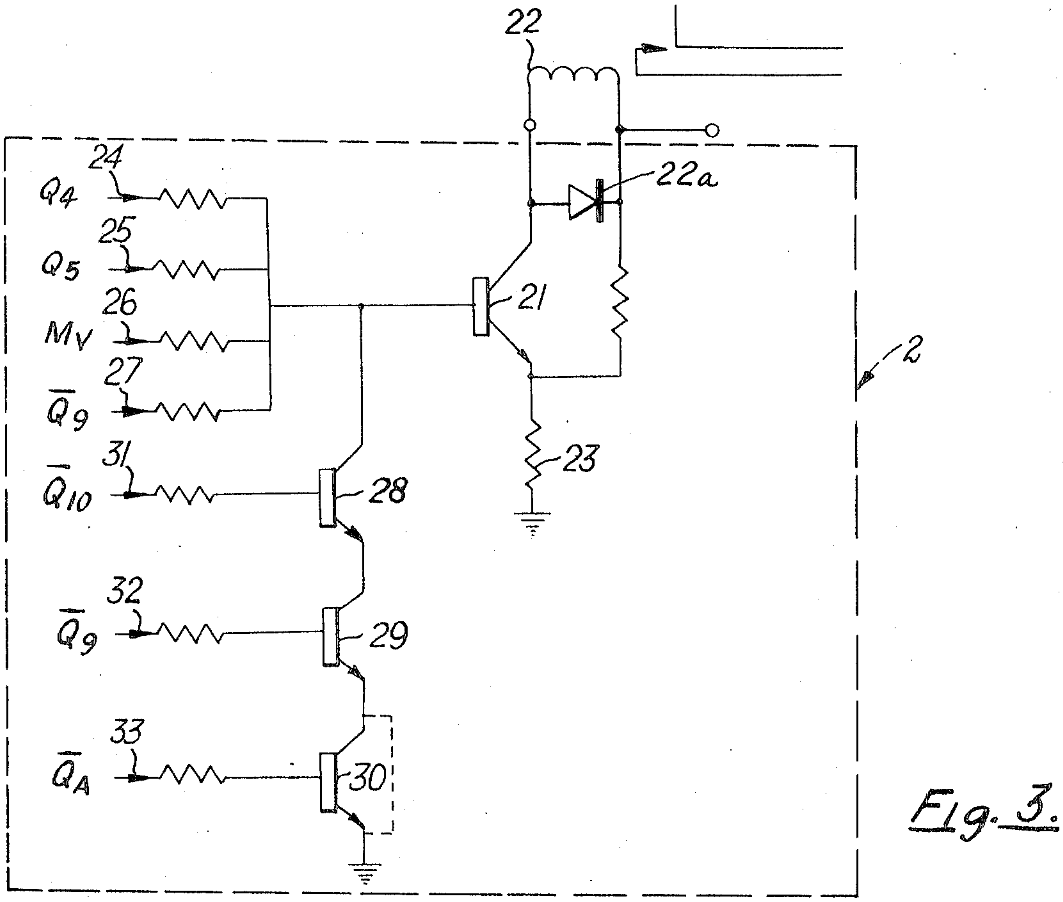
Figure 5:
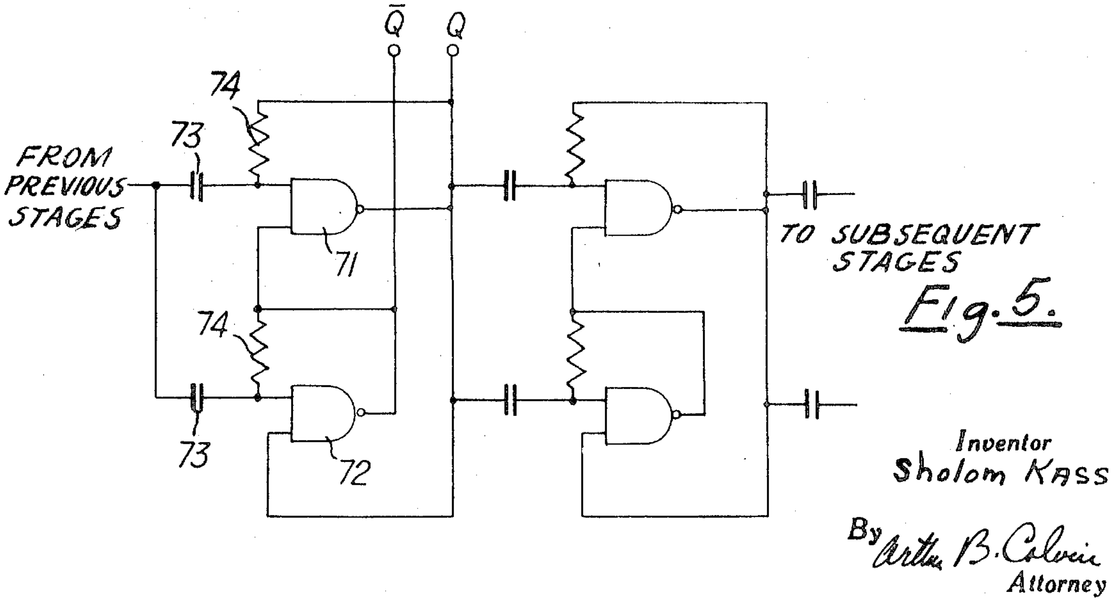
Figure 4:
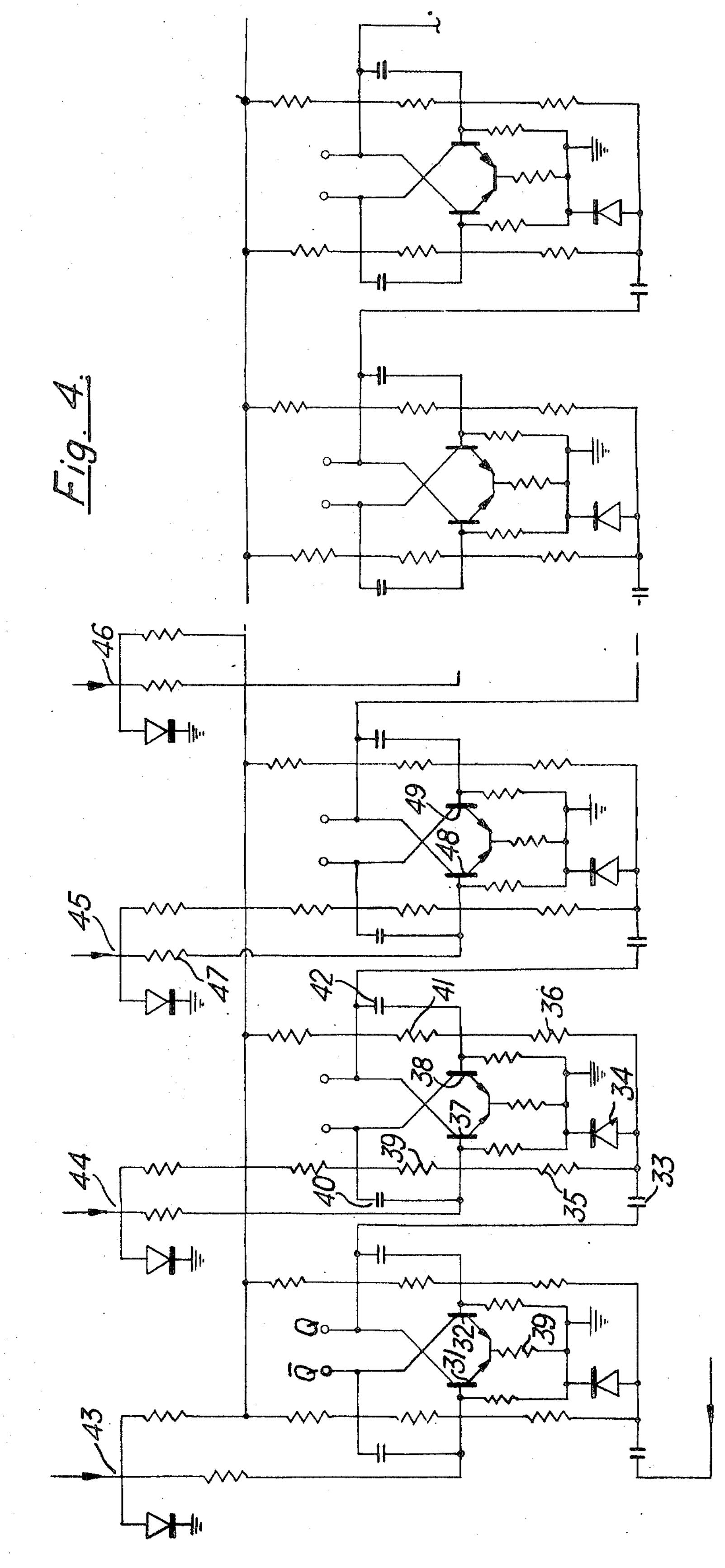
Figure 6:
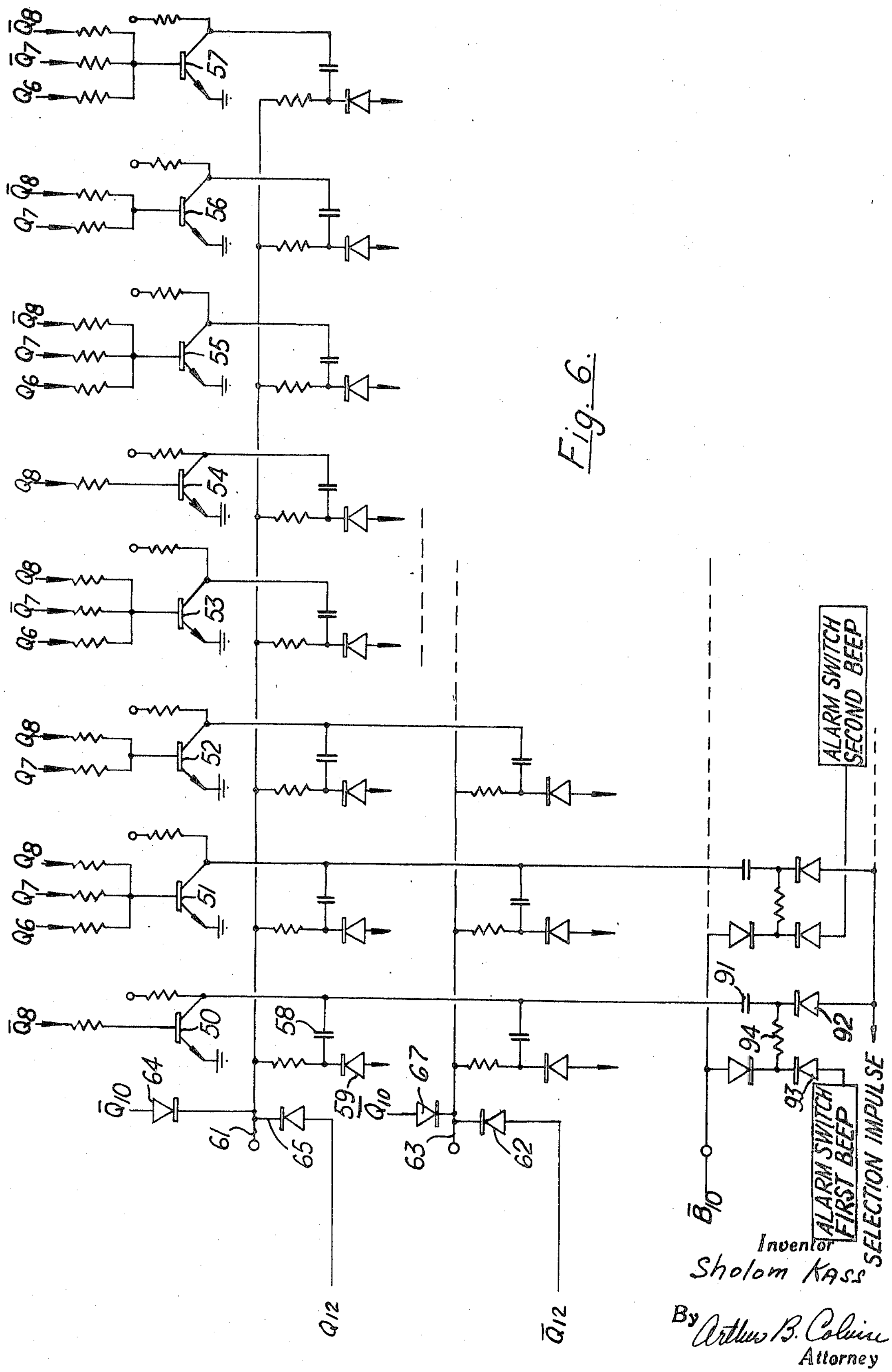
Figure 7:
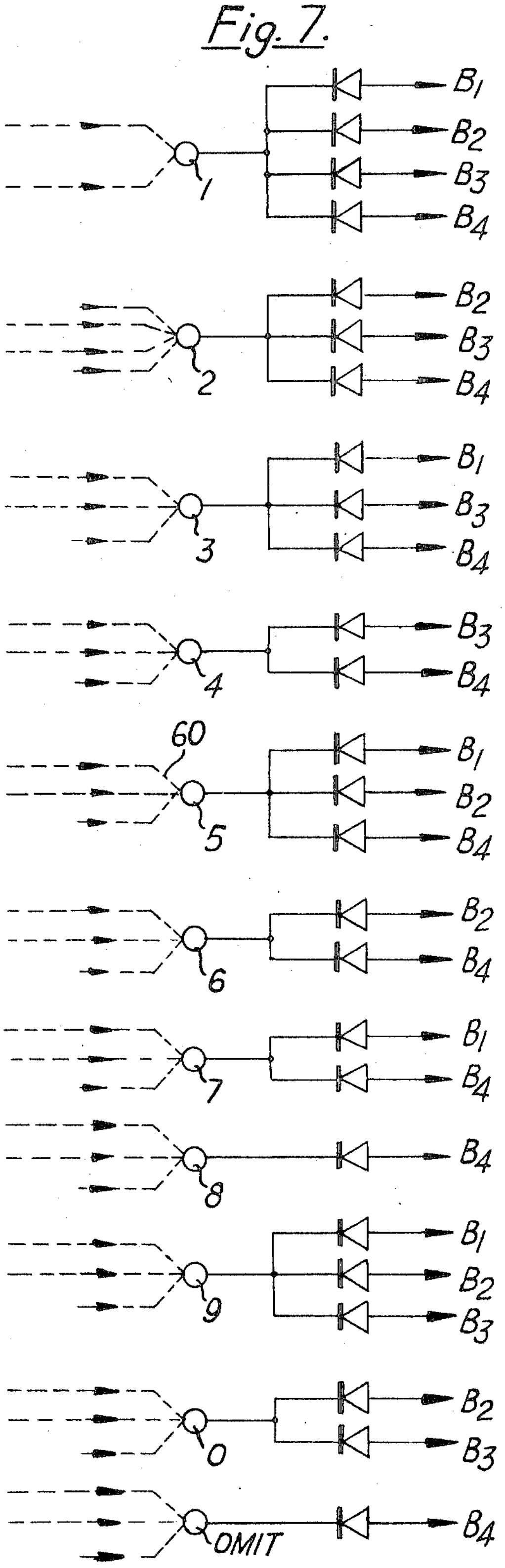
Figure 8:
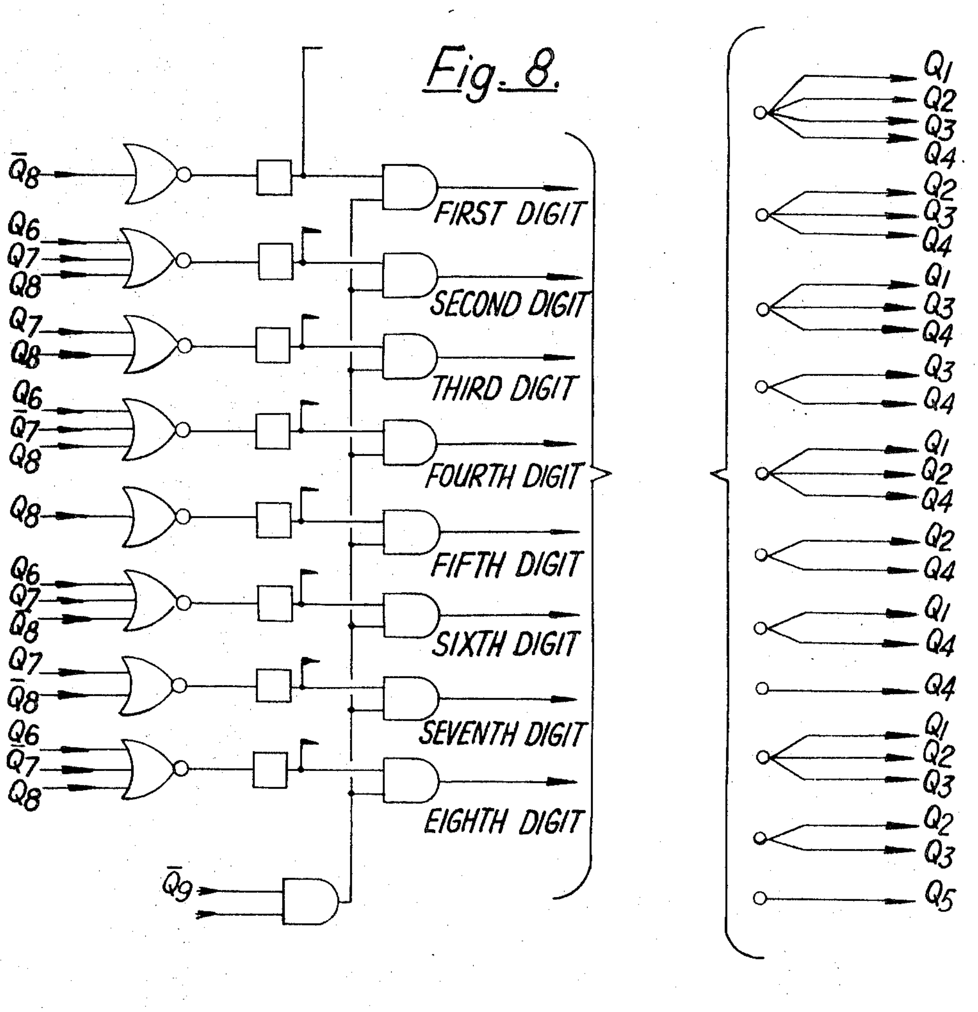
Figure 9:
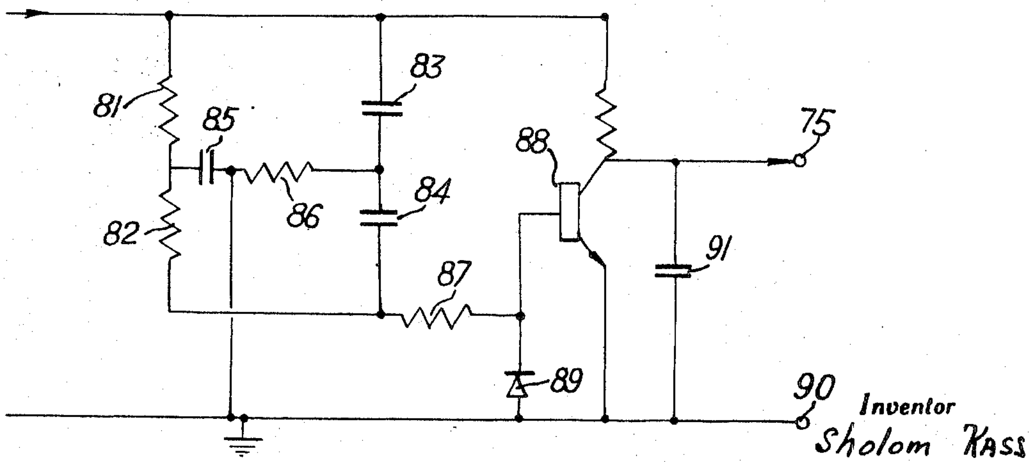

One embodiment of the invention will now be described by way of example and with reference to the accompanying drawings, in which:

FIG. 1 is a schematic block diagram of an automatic dialling system associated with an alarm condition actuating and indicating mechanism in accordance with the invention, FIG. 2 is a timing diagram showing the timing of the constituent periods of an operating cycle of the system shown in FIG. 1, FIG. 3 is a detailed circuit diagram of the main relay gate shown in FIG. 1, FIG. 4 is a detailed circuit diagram of the frequency divider chain shown in FIG. 1, FIG. 5 is a circuit diagram of an alternative form of bistable element for use in the frequency divider chain shown in FIG. 1, FIG. 6 is a detailed circuit diagram of the impulse sequence gate shown in FIG. 1, FIG. 7 is a detailed circuit diagram of the digit selection matrix shown in FIG. 1, FIG. 8 is a logic diagram of the impulse sequence gate and digital selection matrix shown in FIGS. 6 and 7, and FIG. 9 is a circuit diagram of a telephone answer detector network shown in FIG. 1.

Reference will first be made to FIG. 1 of the drawings where is shown, in schematic block form, an automatic dialling system, associated with an alarm mechanism. The system includes a main telephone relay 1 to be connected to the telephone lines and coupled to the output of a main relay gate 2, the latter consisting of an OR gate 3 and a NAND gate 4, the output of the OR and NAND gates 3 and 4 respectively constituting two inputs for an AND gate 5 whose output constitutes the output of the main relay gate 2. The OR gate 3 is provided with four inputs 3/1, 3/2, 3/3 and 3/4 whilst the NAND gate 4 is provided with three inputs 4/1, 4/2, 4/3.

The main relay 1 is operated (i.e. its contacts are closed and the telephone wires are connected in circuit) when it receives a positive impulse from the main relay gate 2, i.e. from the output of the NAND gate 5. In its turn the NAND gate 5 produces a positive output when, and only when, its two inputs (i.e. the two outputs of the OR and NAND gates 3 and 4 respectively) are simultaneously positive. Under all other circumstances the output of the AND gate and consequently of the main relay gate 2 is negative, the main relay is not actuated, its contacts are open and the telephone wires are not connected in circuit.

The conditions for the respective outputs of the OR and NAND gates 3 and 4 being positive at the same time are, on the one hand, that any one of the four inputs 3/1 to 3/4 of the OR gate is positive at that time and, on the other hand, that during that time all three inputs 4/1, 4/2 and 4/3 of the NAND gate are not simultaneously positive.

The significance of these conditions will be understood during the subsequent description of FIG. 1 and of the more detailed circuit diagrams associated therewith. At this stage, however, it will suffice if it is remembered that the main relay 1 is actuated when at least one of the inputs of the OR gate 3 is rendered positive, and when at least one of the inputs to the NAND gate is at the same time rendered negative. When, however, all the inputs to the OR gate are rendered negative and/or all the inputs to the NAND gate are rendered positive then the main relay 1 is deactuated.

The system comprises a divider chain consisting of N bistable elements $B_1$ to $B_N$ each element B being provided with conjugate outputs Q and $\bar{Q}$. Each bistable element can be either in "set" (1) state or in the "clear" (0) state. In the set state Q is positive and $\bar{Q}$ is negative, whilst in the clear Q is negative whilst $\bar{Q}$ is positive. A bistable element B proceeds from one state to the other when it receives a transfer impulse from the preceding element. This preceding element transmits the transfer impulse to the succeeding element only when the preceding element changes from its set state to its clear state, but not vice versa. Thus a preceding element will have to undergo two changes of state for each single change of state experienced by a succeeding element.

Astable multivibrator 6 whose actuation is controlled by a relay 7 and having an output frequency of 10 pulses per second is coupled on one hand to the input of the first bistable element $B_1$ and on the other hand to the input 3/3 of the OR gate 3. Whilst the multivibrator output has a cycle period of 0.1 seconds (hereinafter referred to as the "unit impulse time") the transfer impulse fed to the bistable element $B_2$ has pulse length which is double the unit impulse time whilst the transfer impulse fed to the bistable element $B_3$ has a pulse length which is four times the unit impulse time. In general, the transfer impulse fed to the bistable element $B_N$ has a pulse length which is equal to $2^{n11}$ unit impulse time.

It can be seen from FIG. 1 that the output $Q_5$ of the bistable element $B_5$ is connected on the one hand to the input 3/2 of the OR gate 3 and on the other hand to an input 9/2 of an AND gate 9 constituting a signal control gate. The output of the AND gate 9 is coupled to, and is arranged to actuate an audio signal oscillator 10 which is connected to the telephone lines. The output $Q_9$ of the bistable element $B_9$ is connected to the input 4/3 of the NAND gate 4 whilst the output $\bar{Q}_9$ of the bistable element $B_9$ is connected, on the one hand, to the second input 9/1 of the AND gate 9 and on the other hand to the input 3/1 of the OR gate 3. The output $\bar{Q}_{10}$ of the bistable element 10 is connected to the input 4/1 of the NAND gate 4.

A telephone answering detector 11 is coupled to the telephone lines and has its output coupled to a further bistable element 12 whose output $Q_A$ is coupled to the input 3/4 of the OR gate 3 and whose output $\bar{Q}_A$ is coupled to the input 4/2 of the NAND gate 4.

Let us now consider the operation of that part of the system so far described. Assume that at the start of operation all the bistable elements $B_1$ to $B_8$ are in the clear state, whilst the remaining elements $B_9$ to $B_N$ are in the set state. The relay 7 is actuated (by means to be referred to below) thereby actuating the multivibrator 6. With the actuation of the multivibrator 6 positive impulses, at 0.1 second intervals, are fed to the input of the bistable element $B_1$ and to the input 3/3 of the OR gate 3. With each appearance of a positive impulse at the 3/3 input of the OR gate 3 a positive impulse appears at the output of the OR gate 3 and consequently at one of the inputs of the AND gate 5 irrespective of what appears at the other inputs of the OR gate 3.

Consider now the condition of the input of the NAND gate 4 at the instant of initiation of operation. The 4/1 input is coupled to the output $\bar{Q}_{10}$ of the element $B_{10}$ and, seeing that this element is in the set state, a negative potential will appear at the 4/1 input. Thus, for the reasons indicated above, and irrespective of the potentials which appear at the other inputs 4/2 and 4/3 of the NAND gate, a positive potential appears at the output of the NAND gate and therefore both inputs of the AND gate 5 have positive potentials appearing thereon. Thus at the initiation of operation the positive output of the NAND gate results in the actuation of the main relay 1, the closing of the relay contacts and the placing of the telephone lines in circuit. All this occurs practically instantaneously with the actuation of the multivibrator 6 by the relay 7. This actuation of the main relay 1 continues for a further 16 unit impulse times (a period which will hereinafter be referred to as "a maximum digit time") after which the bistable element $B_5$ becomes set and remains set for a further 16 unit impulse times (hereinafter referred to as a "pause time"). During this pause time a positive potential is continuously applied to the input 3/2 of the OR gate 3, whereby ensuring that the main relay remains actuated and its contacts closed.

During the maximum digit time (when the bistable element $B_5$ is in the clear state) 16 unit impulses could be delivered to the input 3/3 and, as a result, the main relay 1 could be actuated and deactuated 16 times with the consequent theoretically possible transmission of 16 impulses to the telephone lines. During the pause period, however, when the bistable element $B_5$ is in the set state (for a time equaling the maximum digit time) the main relay 1 is continuously actuated and individual impulses can not be transmitted to the telephone lines. There is thus ensured the essential minimum pause between the transmission of the impulses associated with successive digits.

These successive maximum digit and pause times are repeated 16 times (8 maximum digit times and 8 pause periods) corresponding to the maximum number of digits in a telephone number. This period is hereinafter referred to as the "maximum number period". By the end of this maximum number period the bistable element $B_9$, which has up to now been in the set condition, changes into the clear condition, as a result of which a positive potential appears at the output $\bar{Q}_9$ thereof coupled to the input 3/1 of the OR gate whilst a negative potential appears at the output $Q_9$ of the element $B_9$ coupled to the input 4/3 of the NAND gate 4. In consequence the main relay 1 is maintained continuously actuated (even in the periods) and no further impulses are transmitted to the telephone lines which are nevertheless maintained in circuit. The bistable element $B_9$ remains in the clear condition for a period, hereinafter referred to as "wait for answer period" (equal to the maximum number period).

After the "wait for answer" period has been completed the bistable element $B_{10}$ changes into the clear condition as a result of which a positive potential appears at the output $\bar{Q}_{10}$ thereof coupled to the input 4/1 of the NAND gate 4. Now the 4/2 input of the NAND gate 4 is coupled to the output $\bar{Q}_A$ of the bistable element 12 which is in the clear condition as long as it has not received a transfer impulse from the telephone answer detecting network 11. In consequence therefore the input 4/2 of the main gate 1 is also rendered positive. The input 4/3 of the NAND gate is coupled to the output $Q_9$ of the bistable element $B_9$ which, as we have seen, is in the set condition and therefore a positive potential also appears at the input 4/3 of the NAND gate 4. There therefore appear, simultaneously, positive potentials at all three inputs 4/1, 4/2 and 4/3 of the NAND gate 4 and in consequence a negative potential from the output of the NAND gate 4 is coupled to the input of the AND gate 5 resulting in the deactuation of the main relay 1, the opening of the relay contacts, the disconnection of the telephone lines and the initiation of the "hang up telephone" period.

It should be noted at this stage that this deactuation of the main relay with the consequent initiation of the "hang up telephone" period would not have occurred if, during the "-wait for answer" period an answer had been received and detected by the detector 11 thereby transferring to the bistable element $B_A$ into its set condition and ensuring the appearance of a negative potential at the 4/2 input of the NAND gate 4.

The "hang up telephone" period continues for as long as the bistable element $B_{10}$ is in the clear condition, i.e. for a total period corresponding to the "wait for answer period" or the "-maximum number" period, i.e. 16 maximum digit periods.

With the completion of the "hang up telephone" period the bistable element $B_9$ changes into the clear condition in which a positive impulse is applied to the input 3/1 of the OR gate 3, and a negative impulse is applied to the input 4/3 of the NAND gate 4. As long as the bistable element $B_9$ stays in this clear condition, the main relay 1 is actuated and the telephone lines are connected in circuit, but digit impulses are not transmitted to the lines. This period, which is equal in duration to the "maximum number," "wait for answer" and "hang up telephone" periods is referred to as the "wait for dialling tone" period. After the completion of the "wait for dialling tone" period the cycles "dial number," "wait for answer," "-hang up telephone" and "wait for dialling tone" periods referred to above are repeated.

As described up to now (remembering of course that we have not, as yet, described the manner in which the impulses which are transmitted to the telephone lines, are arranged to correspond to the actual digits of a telephone number, but have merely been satisfied, for the purposes of explanation, to describe the transmission of 16 impulses per maximum digit time) the system would continue to redial the number an indefinite number of times, whether an answer had been received or not. It will be realized that this may well be objectionable if only from the point of view that the telephone lines are repeatedly held busy. In order to avoid this situation a constituent bistable element $B_N$ of the divider chain is chosen which changes its state after a predetermined number of complete cycles. After this predetermined number of cycles the bistable element $B_N$ changes into the reset condition, in which condition a negative impulse is transmitted to the relay 7 and results in the deactuation of the multivibrator 6.

Simultaneously, with the change over of the bistable element $B_9$ into the clear condition (at the initiation of the "wait for answer" period) a positive potential is applied to the input 9/2 of the AND gate 9 and this positive potential continues to be applied during the entire "wait for answer" period. The other input 9/1 of the AND gate 9 is however connected to the output $Q_5$ of the bistable element $B_5$ and this output $Q_5$ is rendered eight times during each "wait for answer" period for periods of time corresponding to the maximum digit period. Thus a positive potential appears at the output of the AND gate 9 eight times during each wait for answer period the duration of each positive output being 16 unit input times. In consequence the signal oscillator 10 is actuated and could transmit to the telephone lines audio signals in the form of beeps of this duration and frequency during the "wait for answer period." It will be explained below that, in effect, audio signals of differing durations and frequencies are actually transmitted corresponding to differing alarm conditions which will have given rise to the actuation to the relay 7.

Attention will now be directed to the mans whereby it is ensured that the numbers of impulses transmitted to the telephone lines actually correspond to specific digits of a particular telephone number. These means comprise essentially eight impulse sequence gates $S_i$ to $S_{viii}$ corresponding to the eight digits of a telephone number. The output of each impulse sequence gate S is coupled to a number preselector mechanism via one or more component selector gates $S_iN_i$, $S_iN_2$ etc., (only 2 being shown) corresponding to the different telephone numbers which the system can be set up to dial. It will be understood of course that only one component selector gate SN is connected to each impulse sequence gate at any particular time.

Each of the impulse sequence gates $S_i$ to $S_{viii}$ is provided with one or more inputs which are coupled in a predetermined manner to differing groups of outputs of the bistable elements $B_6$, $B_7$ and $B_8$. The particular interconnections of the inputs of the impulse sequence gates $S_i$ to $S_{viii}$ with the outputs of the bistable elements $B_6$, $B_7$ and $B_8$ are clearly set out in the drawing. As a result of these interconnections negative going voltage impulses appear successively at the outputs of the impulse sequence gates $S_i$ to $S_{viii}$ the appearance of each such negative going impulse denoting the start of the impulse transmission period of a particular digit. Thus, for example, when the negative going impulse appears at the output of the impulse sequence gate $S_1$ the impulse transmitting period associated with the first digit is initiated whilst when the negative going impulse appears at the output of the impulse sequence gate $S_{viii}$ the impulse transmitting period associated with the eight and final digit is initiated. The output of each impulse sequence gate S is connected as described above in a predetermined manner via a component selector gate $SN_1$ and a number preselector mechanism 13 to those specific inputs of the elements of the Digit Selection Matrix $D_0$ to $D_9$ corresponding respectively to the numerical values of the particular digits. Thus, for example, if the first telephone number to be called is 254618 then the number preselector mechanism 13 is so adjusted as to connect the output of the impulse sequence gate $S_i$ through the first selector gate $N_i$ to the input of the digital selection element $D_2$, the output of the impulse sequence gate $S_{ii}$ to the input of the digital selection element $D_5$ and so on until the connection of the output of the impulse sequence gate $S_{vi}$ to the input of the digital selection element $D_8$ are through respective selector gates. Gates $S_{vii}$ and $S_{viii}$ connect to $D_n$.

For the eventuality that the system is to cater for an additional telephone number each impulse sequence gate S is provided with a second component selector gate $SN_2$, the second gates $SN_2$ being connected via the selector mechanism 13 to those inputs of the matrix $D_o$—$D_9$ corresponding to the second number.

In order to ensure the sequential dialling of the two numbers the inputs of the component sequence gates $SN_1$ and $SN_2$ are coupled to the outputs of a pair of AND gates $N_1$ and $N_2$ constituting number enabling gates, one input of each gate being coupled respectively to the inputs $Q_{12}$ and $\overline{Q}_{12}$ of the bistable element $B_{10}$ whilst the other inputs of the gates $N_1$ and $N_2$ are connected in common to the output $\overline{Q}_9$ of the bistable element $B_9$. Thus the outputs of the selection gates are connected to one or other set of numerical inputs of the matrix at a frequency determined by the frequency of the set-clear of the bistable element $B_{12}$.

The digital selection elements $D_o$ to $D_9$ are provided each with as many outputs as required and these outputs are connected to the inputs of the bistable elements $B_1$, $B_2$, $B_3$ and $B_4$ in such a manner and with such a distribution, as to ensure that when a negative going impulse is transmitted from an impulse sequence gate S associated with a particular digit to the digital selection element D preconnected to that impulse sequence gate S, say the digital selection element $D_2$, the coupling of the element $D_2$ to the bistable elements concerned ensures that negative going impulses are simultaneously transmitted to the inputs of those bistable elements and as a consequence only that number of impulses corresponding to the numerical magnitude of the particular digit is transmitted to the telephone lines.

The particular interconnection of the digit selection elements to the bistable elements $B_1$ to $B_4$ is set out in FIG. 1 of the drawings and it will be possible to understand the manner in which the required number of impulses are transmitted to the telephone lines for each particular digit, if we take a particular example.

Let us consider as an example the impulsing of the telephone lines in accordance with the number 254618. With the appearance of the negative going impulse at the input of the impulse selection gate $S_1$ this negative going impulse is transmitted via the number preselector 13 to the digital selection element $D_2$ and negative going impulses appear simultaneously at the inputs of the bistable elements $B_2$, $B_3$ and $B_4$ as a result of which these bistable elements change state. Now in the particular example being discussed the three bistable elements $B_2$, $B_3$ and $B_4$ change state simultaneously. In the case of the bistable element $B_2$ this change of state would normally have required two impulses of the multivibrator; in the case of the bistable element $B_3$ this would normally have required for impulses of the multivibrator whilst in the case of the bistable element $B_3$ this would normally have required eight impulses of the multivibrator. Now as we have previously seen, 16 impulses of the multivibrator are normally required before the bistable element $B_5$ changes state so as to mark the end of a maximum digit period. In the present case, however, the bistable element $B_5$ will change state when a number of impulses equal to $16-(2+4+8)=B2$ impulses have been transmitted. In other words by virtue of the preconnection of the impulse sequence gate $S_1$ to the digital selection element $D_2$ two impulses will have been transmitted to the telephone lines, i.e. the number 2 will have been "dialled," thus marking the end of the first actual period. After the transmission of these two impulses and the change of state of the bistable element $B_5$ the interdigital pause period referred to above ensues after which the bistable element $B_5$ again changes state marking the initiation of the second actual digit period whereupon a negative going pulse appears at the output of the impulse sequence gate $S_{ii}$ and is transmitted to the digital selection element $D_5$ whose outputs are connected to the inputs of the bistable elements $B_1$, $B_2$ and $B_4$ with the result that the number 5 is "dialled." In this way all the digits are successively dialled.

In the event that the number to be "dialled" includes less than eight digits then the impulse sequence gate or gates corresponding to the digit or digits to be omitted are connected by the preselector 13 to the digit selection element $D_n$ whose output is in turn connected to the input $Q_5$ of the bistable element $B_5$. Thus when a negative going impulse is received at the input of the bistable element $B_5$ that bistable element immediately changes state (a procedure which would otherwise have required the passage of 16 impulses) and a digit is correspondingly omitted.

With the "dialling" of the number as described above, the remaining periods of the cycle previously described, namely the wait for answer period, hang-up telephone period, wait for dialling tone period, etc., are proceeded with, either until an answer is received whereupon the cycle is interrupted or until a number of cycles predetermined by the change of state periodicity of the bistable element $B_n$ have taken place after which the system is deactuated.

As indicated above, with the system as described hitherto the number preselector 13 can be designed and preset as to arrange for alternate or sequential dialling of two or more numbers.

This sequential dialling is effected either by means of the gates $N_1$ and $N_2$ or, alternatively, of course, the switching between numbers can be effected manually or mechanically by the appropriate application of a positive voltage to that set of component sequence gates NS associated with the number not to be dialled.

As indicated above, the system is actuated by the actuation of the relay 7. In the particular example now being discussed the relay 7 is actuated upon the closing of any one or more of a series of alarm switches $A_1$ to $A_n$. Each alarm switch A is associated with an alarm diode network F there being provided in all *n* alarm diode networks, where *n* is not greater than 8. Each of the diode alarm networks F is coupled to the output $Q_9$ of the bistable element $B_9$ and is designed to be actuated when the bistable element $B_9$ is in the set condition, i.e. when a positive potential appears at the output $Q_9$. Additionally the digit selection impulses $S_1$ to $S_n$ are respectively coupled to the diode alarm networks $F_1$ to $F_n$.

With the actuation of the relay 7, and during the wait for answer period, as we have seen before beeps of 16 unit impulse time durations are transmitted to the telephone lines from the signal oscillator 10. Now the various alarm switches $A_1$ to $A_n$ are effectively and sequentially interrogated by the digit selection impulses $S_1$ to $S_n$. If now the alarm switch $A_1$ has not been actuated, i.e. is open, the positive potential applied to the diode alarm network $F_1$ from the output $Q_9$ results in the transmission of the negative going selection impulse $S_1$ to the digital selection element $D_2$ to which each diode alarm network F is permanently connected. As a result conditions are established that a short beep of duration equal to two impulse units times is transmitted to the telephone lines. The subscriber hearing this short beep as the first audio signal will interpret it as meaning that the first alarm condition has not occurred.

In the event that the second alarm switch $A_2$ has been closed as a result of the second alarm condition occurring the closing of this alarm switch $A_2$ results in the elimination of the positive voltage bias applied at the diode alarm network $F_2$ from the output $Q_9$ and as a result the negative going impulse is not applied to the digital selection element $D_2$ and a long beep which is of full 16 unit impulse time duration is heard thereby indicating an alarm condition.

In this way a subscriber receiving the telephone call and knowing the sequential order of the alarm conditions can easily determine which of the conditions have occurred.

It has already been mentioned that the system described above is capable of ready application as an automatic telephone dialling system quite independent of its actuation by an alarm condition. Thus, the relay 7 can be mechanically or electronically actuated and in consequence one or more numbers preselected by the number preselector 13 can be alternately or sequentially dialled, audio or visual means being provided to indicate when a call has been answered and which subscriber is involved.

Furthermore, the provision of a telephone answering detector 11 is optional in the case of an alarm system as is the provision for limiting the maximum number of calls which can be made. Thus it may be positively desired that calls be repeatedly made to indicate an alarm condition and that the repetition of the calls be terminated only when someone has responded to the calls, arrived on the spot, dealt with the alarm condition and manually opened the relay 7.

On the other hand, where the system is designed for use for automatic dialling of preselected numbers the provision of telephone answering detector and means for limiting the number of calls is highly desirable so as to avoid placing an undue load on the telephone lines.

Furthermore, whilst in the specific arrangement described above specific audio signals in the form of beeps of differing lengths are transmitted to the telephone lines so as to indicate certain alarm conditions it will be readily understood that the system allows for the generation and transmission of various combinations of beep lengths and also allows for the entire replacement of the signal oscillator by, for example, a recorded message transmitter which automatically transmits a readily intelligible message during the wait for answer period.

The sequence of the various periods constitute a full cycle is clearly illustrated in FIG. 2 which is a timing diagram. It will be realized that the digit dialling period is of variable duration depending on the magnitude of the digits being dialled. The other periods, however, are of fixed duration (in the example described they are of 32×16 unit impulse times). The start of the wait for answer period and consequently the remaining two periods of a cycle depends of course on the termination of the digit dialling period. The timing diagram furthermore clearly indicates the true output wave forms of the bistable elements $B_5$ to $B_{10}$ and the location of the negative going digit selection voltage impulses.

Reference will now be made to the remaining drawings for a description of some of the main components of the system illustrated schematically in FIG. 1.

FIG. 3 is a detailed circuit diagram of the relay gate 2 shown in FIG. 1 as consisting of an OR, and NAND and an AND gate. As seen in FIG. 3 the relay gate 2 comprises a transistor 21, the relay winding 22 of the main relay 1 being connected between the collector and collector supply voltage, the emitter being connected to earth via a resistor 23. A protective diode 22*a* is connected across the relay winding 22. The base of the transistor 21 is connected to the junction of four resistors, 24, 25, 26 and 27 the other ends of the resistors being respectively adapted to be coupled to the outputs $Q_n$, $Q_5$, multivibrator, and $\bar{Q}_9$. The base of the transistor 21 is coupled to the collector of a transistor 28 the emitter of which is connected to the collector of a transistor 29, the emitter of the transistor 29 being connected to the collector of a transistor 30, the emitter of the transistor 30 being connected to earth. The bases of the transistors 28, 29 and 30 are connected respectively through resistors 31, 32 and 33 to the outputs $\bar{Q}_{10}$, $Q_9$ and $\bar{Q}_n$.

The sequence of operations leading to the opening and closing of the relay have been previously described and will not be referred to here again. It need only be noted that in the event that there is no requirement in the system for the detection of an answer and the consequent interruption of the dialling (i.e. the components 11 and 12 shown in FIG. 1 can be omitted), the resistors 24 and 33 are omitted whilst the transistor 30 is merely short circuited.

FIG. 4 is a detailed circuit diagram of the divider chain constituted by the bistable elements $B_1$ to $B_n$ shown in FIG. 1 wherein each bistable element is constituted by a pair of transistors interconnected so as to form a flip-flop, the conjugate outputs Q and $\bar{Q}$ of each flip-flop being respectively derived from the collectors of the transistor pair. The flip-flop configuration just described is repeated as indicated so as to provide a binary divider chain of N stages. Coupling between these stages is by means of a capacitor 33, diode 34 and resistors 35 and 36. The time constant of the capacitor-resistor coupling combination is small as compared to the time in which any bistable unit remains in a given state and therefore a negative current pulse appears at the bases of the transitor pair of a succeeding stage when the first transistor (e.g. the transistor 32) of the preceding stages passes from the conducting to the nonconducting state. The appearance of the negative current pulse results in the decrease of the current flow through that transistor of the transistor pair of the succeeding stage which was originally in the conducting state with a consequent increase in the voltage at the collector of that transistor. Depending on the identity of the transistor of the succeeding stage which is affected in this manner this voltage increase at the collector of that transistor causes current to flow through the capacitor 40 and resistor 39 or alternatively through the capacitor 32 and the resistor 41 thereby initiating the regenerative process which causes this succeeding bistable element to change stage.

FIG. 4 also shows how the negative going pulses transmitted from the digit selection matrix are fed to the four initial bistable elements. For this purpose each bistable element is provided with an input lead which is connected in series with a resistor 43 with the base of the first transistor (e.g. the transistor 31) of the transistor pair. When a negative going impulse is applied to the lead the transistor 31 will be cut off as a result of which the bistable element changes state. The manner in which the feeding of these digit selection impulses to the bistable elements results in the selection of the appropriate digits to be dialled has been previously explained.

Whilst the bistable elements shown in FIG. 4 consist of standard flip-flop circuits a novel alternative bistable element in accordance with an aspect of the present invention is shown in FIG. 5. Each bistable element consists of a pair of dual input NAND gates 71 and 72 which are interconnected by having the output of each gate coupled to one input of its partner. Additionally the other input of each gate is connected via a capacitor 73 to the output of the previous stage and via a resistor 74 to its own output. In this way it is ensured that a transfer impulse consisting of a negative going wave form from a preceding stage will cause the succeeding stage to change state. The FIG. shows two of the stages of a frequency divider chain constituted by bistable elements designed in this fashion. A particular advantage of such bistable elements resides in the fact that the four constituent NAND gates constituting a pair of stages are available as an integrated circuit and are considerably more economical than "master and slave" flip-flops normally supplied in integrated circuitry.

FIG. 6 is a more detailed circuit diagram showing the construction and interconnection of the impulse sequence gates indicating quite clearly how selection impulses corresponding to the different digits of two or more telephone numbers are produced as well as the selection impulses for the differing alarm beeps.

As can be seen the sequence gates S consist respectively of transistors 50 to 57 whose bases are connected via resistors to the outputs of the bistable elements B in the manner illustrated in and explained with reference to FIG. 1 of the drawings.

When the required outputs appear at the base of a transistor constituting a particular sequence gate (i.e. associated with a particular digit) a drop in voltage occurs at the collector of that transistor and this drop in voltage produces a negative going current pulse in a capacitor 58 which pulse passes through a diode 59 (constituting the component selection gate $NS_1$ of the first number) and from thence to the number preselector mechanism 13 where it is preconnected to a specific number. The results of the appearance of the negative going selection impulse at a predetermined input of the digit selection matrix has previously been described and involves the impulsing of the telephone line with the number of impulses corresponding to the required digit.

FIG. 7 is a circuit diagram of the digit selection matrix from which it can be seen that each input of the matrix is connected via one or more diodes to the required input or inputs of the first, second, third and fourth bistable elements.

It will be furthermore seen from FIG. 7 that each separate input of the digit selection matrix is associated with several input leads corresponding to the several telephone numbers which the system can be arranged to dial. Additionally the "2" digit input is associated with an additional input lead associated with the selection impulses for the short alarm beep.

Thus if, for example, a negative going selection impulse passes to the point 60 shown in FIG. 7 then this negative going impulse will be applied simultaneously to the bistable units $B_1$, $B_2$ and $B_4$ reducing by 11 the number of multivibrator impulses required to transfer the bistable unit $B_5$ to the required set condition. In view of the fact that 16 pulses would otherwise have been required to bring the bistable unit $B_5$ to the set position only five will now be needed and in consequence the digit 5 will have been dialled immediately after the transmission of the negative going impulse through the diode 59. In a similar way negative going impulses are successively transmitted through the remaining seven diodes 59 initiating the dialling of the seven remaining digits.

Now the passage of negative going impulses through these diodes 59 only takes place when a zero or near zero potential is applied to the terminal 61 (associated with the first telephone number). The application of a positive potential to the terminal 61 has the result that no negative going pulses are transmitted to the diode 59 and in consequence no dialling impulsing associated with the first number can take place.

Now the terminal 61 is as indicated above associated with a first telephone number and the outputs of the diodes 59 are preconnected through the number preselector mechanism 13 to a first telephone number. In a similar way the terminal 63 is associated with a second telephone number and the outputs of diodes 62 which are connected via capacitors 67 to the collectors of the transistors of the impulse sequence gates are coupled through the number preselector mechanism 13 to a second telephone number. Further terminals and diodes can be provided if the system is to cater for the dialling of further telephone numbers. It will therefore be readily understood that if, during the dialling period, a positive potential is applied to the terminal associated with one telephone number whilst a zero or near zero potential is applied to the terminal associated with a second telephone number only the second telephone number will in fact be dialled.

The sequential application of the required potentials to the terminals associated with the different telephone numbers is effected as follows.

As can be seen from FIG. 6 the output $\bar{Q}_{10}$ is coupled to the terminal 61 via a rectifier 64 whilst the output $Q_{12}$ is coupled to the terminal 61 via a rectifier 65. Similarly the output $\bar{Q}_{10}$ is coupled via the diode 67 to the terminal 63 but in this case the output $\bar{Q}_{12}$ is coupled to the terminal 63. In this way it can be ensured that the two telephone numbers are alternately called at a frequency corresponding to the frequency of flipping of the bistable element 12.

It can readily be envisaged how the appropriate connection of the set and clear outputs of further bistable elements to the terminals associated with further telephone numbers can result in the sequential dialling of more than two telephone numbers.

As has been previously indicated the impulse sequence gates S are not only employed for initiating the digital impulsing of the telephone lines but are also employed for providing the selection impulse for the different audio alarm signals associated with the differing conditions. As has been previously explained each digital selection impulse is associated with a differing alarm condition. Consider the circuitry associated with the first alarm condition and with the first selection impulse (the circuitry associated with the remaining alarm conditions and impulses are identical). An alarm condition selection voltage terminal which is connected in common with all the alarm condition circuits is coupled to the output $Q_{10}$ of the bistable element $B_{10}$. In consequence a negative potential will be applied to this terminal. The selection impulse is connected via a capacitor 91 and a diode 92 to the 2 inputs of the digit selection matrix.

Now when the bistable element $B_{10}$ is the clear state a positive potential appears at the alarm condition selection voltage terminal and prevents the negative going selection impulse reaching the 2 input of the digit selection matrix.

Alternatively, when $B_{10}$ is in the set state and when the first alarm condition switch is actuated a positive potential is applied via an alarm condition gate, i.e. a diode 93 and resistor 94 and this again prevents the transmission of the negative going selection impulse to the digit selection matrix and the occurrence of the alarm condition is identified by the appearance of a full duration beep.

The arrangement of the circuitry is such that when the first alarm switch has not been actuated so as to indicate the absence of a first alarm condition no positive voltage is applied and the negative going impulse is transmitted to the "2" input of the digit selection matrix resulting in the transmission of an audio signal beep of two units impulse time duration whilst when the first alarm switch mechanism has been actuated thus indicating that the first alarm condition has occurred a positive voltage is applied so that no selection impulse is transmitted through the diode and in consequence the signal associated with the first alarm condition is a continual beep of 16 unit impulse times. In this way, and as indicated above, the subscriber can readily identify which alarm condition is operated.

It will be readily appreciated that various other circuit combinations can be arranged so as to give differing durations of audio signals associated with differing alarm conditions.

FIG. 8 is a schematic circuit diagram of the impulse sequence gates and digit selection matrix (the electronic circuits of which have been shown in detail in FIGS. 6 and 7 of the drawings) in the form of a logic diagram whose significance is self-explanatory bearing in mind the previous description and therefore no further explanation is required at this stage.

FIG. 9 is a circuit diagram of the telephone answering detecting network referred to above with reference to FIG. 1 of the drawings. The operation of this network is based on the fact that in most telephone systems a short alternating current impulse of fixed frequency (say 50 cycles) appears on the telephone lines immediately after a telephone call has been answered. The detector network consists of a standard twin T network wherein a pair of resistors 81 and 82 and a pair of capacitors 83 and 84 are connected in parallel the resistor junction being connected to the capacitor junction by a further series connected capacitor 85 and resistor 86 the junction of the capacitor and resistor being connected to earth. The twin T network is connected via a resistor 87 on the one hand to the base of transistor 88 and via rectifier 89 to earth whilst the other terminal 90 of the twin T network is connected via a resistor to the collector of the transistor 88, the emitter of the transistor 88 is connected to earth whilst the collector is connected via a capacitor 91 to earth, the output of the detector network being derived from the collector and earth terminals thereof. The detector network is connected to the telephone lines and in this way any alternating voltages received from the lines is applied simultaneously to the collector of the transistor 88 and via the twin T network to the rectifier 89 in the base circuit of the transistor 88. If the alternating voltage frequency applied to the detector corresponds to that to which the twin T network gives a null result, the transistor 88 will only conduct during the negative half cycle of the alternating voltage (it being understood that the transistor is an NPN transistor). Thus a net positive voltage will appear at the output of the detector. If, however, a voltage of a frequency other than that for which the twin T network gives null result is applied to the detector a positive voltage will be applied to the base of the transistor 88 via the twin T network and rectifier 89 and under these circumstances the transistor 88 will conduct on both the positive and negative cycles and no voltage will appear at the output.

Assuming that the twin T network is designed to give a null result for voltages of 50 cycles then the appearance of a 50 cycle voltage at the input of the detector will result in a positive output and the corresponding actuation of the bistable element $B_A$ associated with the detector and described with reference to FIG. 1 of the drawings (this occurring when the telephone call has been answered). In the absence of any answer no voltage will appear at the output and the bistable element $B_A$ will not be actuated.

The number preselector mechanism 13 referred to above with reference to FIG. 1 of the drawings by means of which connection is established between the outputs of the impulse sequence gates 8 and the digit selection matrix D can be constituted by any means which serves to establish electrical contact between the outputs of the selection gates 8 and the appropriate inputs of the matrix D. Thus each digital output of the selection gates can be present, for example by a single pole 11 position switch. Alternatively the electrical paths may be established by means of diode gates, Neon glow lamps, transistor gates, or other switching means.

In the case where selection is to take place between a predetermined number of telephone numbers a preselector mechanism can be effectively designed by means of which the differing outputs of the selection units can be connected at will to the differing numbers. For this purpose printed circuit boards are particularly to be preferred for establishing the fixed connections whilst the displaceable connections can be established by appropriate sliders, brushes or the like.

Whilst the present invention has been specifically described in connection with an automatic dialling arrangement which is capable of automatically dialling one or other of a plurality of preselected telephone numbers in response to an actuating impulse originating in an alarm situation and thereafter transmitting information in the form of predetermined audio signals capable of identifying the particular alarm situation, the system is equally capable of use in the case where it is actuated at will so as to dial any of a series of telephone numbers to place the subscriber in direct communication with the called number or so as to transmit to the called number a prerecorded message.

The system is of particular advantage, for example in offices, where it can be actuated to establish connection with a called number the number being repeatedly dialled in the case that it is initially busy without tying down an operator for this purpose. Alternatively where the subscriber wants to call a series of numbers successively the system can be arranged to call the first number and after this has been successfully done or after a predetermined number of telephone calls to that number has not resulted in contact being established (the line being continually busy, out of order, or no reply being received for any other reason) the system then proceeds to call the next number and so on. The system can readily be provided with visual and/or audible signalling means whereby the subscriber can readily see when contact has been established with the called number and which called number is involved.

Finally, it will be realized that the use of the system for automatically dialling predetermined telephone numbers constitutes only one application of the automatic transmission of digital information in accordance with the present invention. In its broadest sense the system in accordance with the present invention can be used for the automatic transmission of any predetermined or preselected series of digital information to a transmission line either in response to an actuating alarm condition or in response to actuation at will.

I claim:

1. An automatic digital impulse transmission system for actuating an automatic dial telephone exchange comprising relay means coupled to telephone lines and adapted to connect and disconnect the system to and from the telephone lines, a frequency divider chain formed of a plurality of interconnected bistable elements, a source of impulses, actuating means for actuating the source of impulses, means for connecting the source of impulses to the divider chain so as to actuate it, means for connecting the source of impulses to the relay means, gate circuits, means for responsively coupling said gate circuits to the outputs of different constituent bistable elements of the chain so as to actuate and deactuate the relay means in accordance with a cycle of time intervals which includes a digit impulsing period during which impulses corresponding to the respective digits of a telephone number are transmitted to the lines, a main relay gate included in said gate circuits and adapted to actuate and deactuate the relay means in accordance with the required cycle of operations, a series of impulse sequence gates, a digit selection matrix, means for preconnecting the impulse sequence gates to the appropriate inputs of the digit selection matrix via which the bistable elements are to be set so as to insure the actuation and deactuation of the main relay gate during a digit impulsing period in accordance with the respective digits of a telephone number to be dialed, means for responsively coupling inputs of said impulse sequence gates to the outputs of particular bistable elements of the frequency divider chain, means for coupling the outputs of the impulse sequence gates to the inputs of other bistable elements of the frequency divider chain via a plurality of number selection gates corresponding in number to the total number of digits to be dialed, so as to produce digit selection impulses whose occurrence initiates the impulsing of the telephone lines in accordance with the particular digit involved, a number preselector mechanism means for preconnecting the outputs of the number selection gates via said number preselector mechanism to the appropriate inputs of the digit selection matrix and thence to the bistable elements, number enabling gates and means for connecting the number enabling gates to the number selection gates so as to enable them thereby to insure that only the appropriate set of component number selection gates actuate the digit selection matrix at any given time.

2. An automatic system according to claim 1, wherein said gate circuits include a signal control gate coupled to the outputs of preselected bistable elements of the frequency divider chain, the output of said signal control gate being coupled to and arranged to actuate an audio signal generator coupled to the telephone lines, the arrangement being such that said generator is actuated by said signal control gate during a predetermined interval during said cycle of operations.

3. An automatic system according to claim 2, and comprising a plurality of alarm condition switches respectively responsive to the creation of any one or more of a like plurality of alarm conditions and responsively connected to said actuating means, the arrangement being such that when any one or more alarm conditions occur said actuating means actuates the impulse source, each of said alarm condition switches being separately coupled to an alarm gate circuit and to a separate impulse sequence gate, the arrangement being such that a sequence of alarm signals is transmitted from the audio signal generator to the telephone lines in accordance with the impulses fed from the impulse sequence gates, the duration or nature of the alarm signal depending on whether the associated alarm condition switch is actuated or deactuated.

4. An automatic system according to claim 1, wherein the output of one of said bistable elements is coupled to said actuating means so as to ensure the cessation of the impulsing of the telephone lines after a predetermined number of cycles.

5. An automatic system according to claim 1 and including a telephone answer detector coupled to a further bistable element the output of the further bistable element being coupled to said relay means, the arrangement being such that upon a telephone call being answered said detector transmits a transfer impulse to said further bistable element so as to interrupt further impulsing of the telephone line.

6. A system according to claim 5, wherein said telephone answer detector comprises a twin T network connected in parallel with the collector circuit of a transistor, said detector being connected to the telephone lines so as to detect an alternating voltage of a predetermined frequency which appears on the telephone lines upon answering of the telephone call.

7. An automatic system according to claim 1, wherein said bistable elements are constituted by conventional flip-flop circuits.

8. An automatic system according to claim 1, wherein each bistable element is constituted by a pair of dual input NAND gates the outputs of each NAND gate being connected to the input of the other NAND gate, the additional input of each NAND gate being connected via a capacitor to the output of the preceding bistable element and via a resistance to its own output.